United States Patent
Krebs

(10) Patent No.: US 7,360,125 B2
(45) Date of Patent: Apr. 15, 2008

(54) METHOD AND SYSTEM FOR RESOLVING ERROR MESSAGES IN APPLICATIONS

(75) Inventor: Andreas S. Krebs, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 579 days.

(21) Appl. No.: 10/871,079

(22) Filed: Jun. 18, 2004

(65) Prior Publication Data
US 2005/0283675 A1 Dec. 22, 2005

(51) Int. Cl.
*G06F 11/00* (2006.01)
(52) U.S. Cl. .............................. 714/48; 714/38; 714/57
(58) Field of Classification Search .................. 714/57, 714/48, 38
See application file for complete search history.

(56) References Cited

U.S. PATENT DOCUMENTS

| | | | |
|---|---|---|---|
| 6,334,193 B1 * | 12/2001 | Buzsaki | 714/2 |
| 7,082,555 B2 * | 7/2006 | Toyooka et al. | 714/48 |
| 2005/0120273 A1 * | 6/2005 | Hudson et al. | 714/38 |
| 2005/0273667 A1 * | 12/2005 | Shrivastava et al. | 714/38 |

* cited by examiner

*Primary Examiner*—Yolanda L Wilson
(74) *Attorney, Agent, or Firm*—Blakely, Sokoloff, Taylor & Zafman LLP

(57) ABSTRACT

A computer-implemented method to resolve errors pertaining to a computer-based application includes automatically determining whether input to resolve an error, pertaining to the computer-based application, exceeds a level of complexity. If not, then the error is presented to a user in conjunction with an input field to receive input from the user to resolve the error.

27 Claims, 12 Drawing Sheets

METHOD AND SYSTEM FOR RESOLVING ERROR MESSAGES IN APPLICATIONS

FIELD OF THE INVENTION

An exemplary embodiment relates generally to the field of computer programming and, in one specific embodiment, to a method for resolving error messages pertaining to a computer-based application.

BACKGROUND OF THE INVENTION

Many computer-based applications have mechanisms (e.g., message consoles) that serve to identify problems (e.g., provide warnings, errors etc.), pertaining to a computer-based application, to a user. To resolve problems so identified, a user typically has to be intimately familiar with the computer-based application in order to fully appreciate the meaning and significance of the problem, and may also require a deep understanding of the computer-based application in order to resolve the problem. For example, a problem may relate to the absence or formatting of certain input information that is required by the computer-based application. Typical prior art message consoles simply identify the problem to bring it to the attention of-a user. In the example of missing input information, the user might be required to know which field to input the missing information into, and a location in the application where the missing input information can be inputted.

In order to assist a user in addressing problems that are presented, for example within a message console, automated processes may be provided to guide the user. However, the implementation and functioning of such user assistance, in an automated fashion, presents a number of technical challenges.

SUMMARY OF THE INVENTION

According to one aspect of the present invention, there is provided a computer-implemented method to resolve errors pertaining to a computer-based application. An automatic determination is made whether an input, to resolve an error pertaining to the computer-based application, exceeds a predetermined level of complexity. If not, the error is presented to a user in conjunction with an input field to receive input from the user to resolve the error.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A computer-implemented method, and system, to resolve errors pertaining to a computer-based application are described. In the following description, for the purposes of explanation, numerous specific details are set out in order to provide a thorough understanding of the present invention. It will be evident, however, to one skilled in the art that the present invention may be practiced without these specific details.

Specifically, it will be noted that an exemplary embodiment of the present invention is described below within the context of an "e-learning" application, with respect to which users may be allocated one or more roles. This "e-learning" application is merely provided as an exemplary computer-based application, and the invention may find form and application in any computer-based application.

Figure 1:
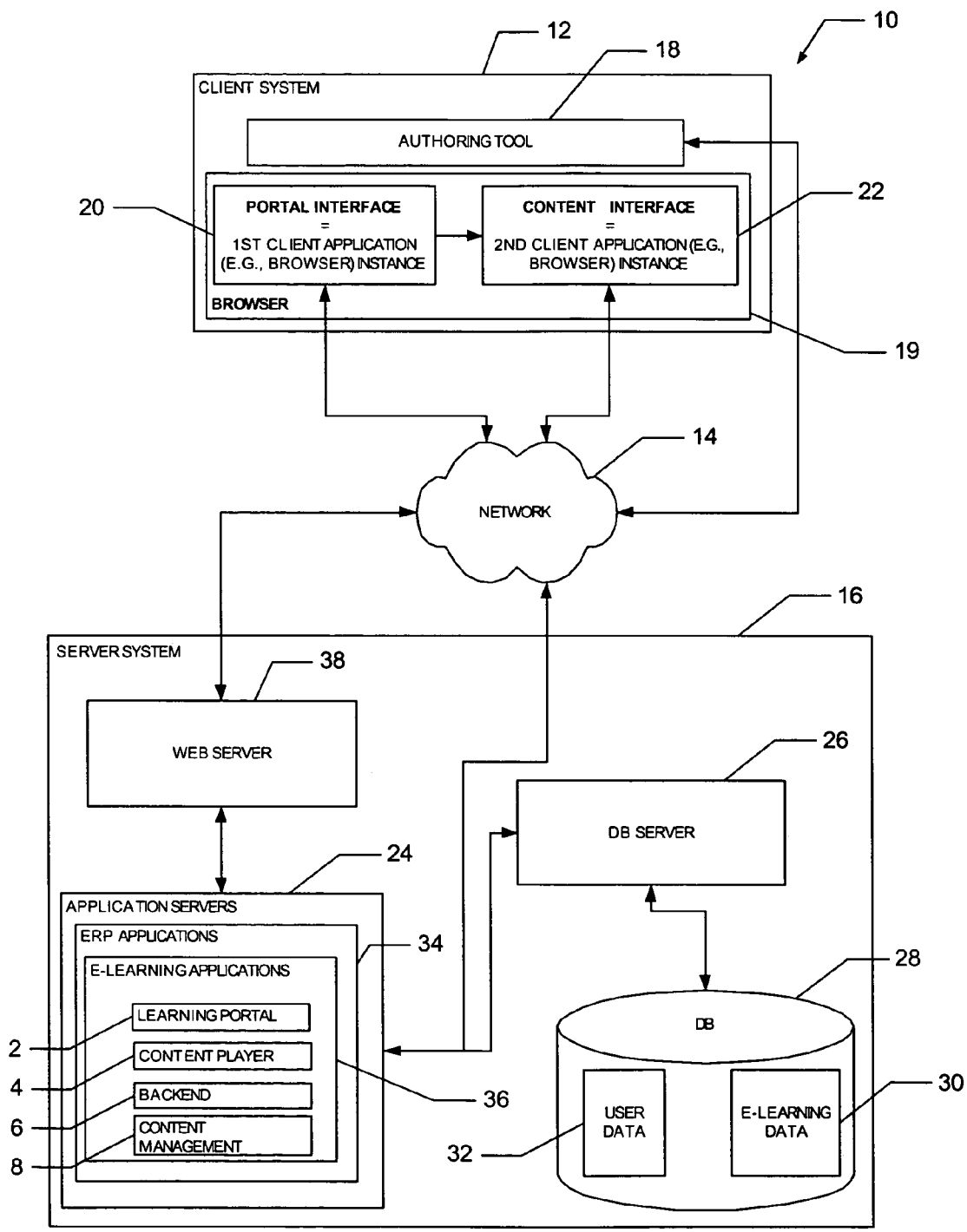
FIG. 1 is a block diagram illustrating a network environment within which an exemplary embodiment of the present invention may be deployed.

FIG. 1 is a block diagram illustrating a network environment 10 within which an exemplary embodiment of the present invention may be deployed. The present invention is of course not limited to a networked deployment, and could equally find application in a stand-alone environment. Further, while the network environment 10 is shown to deploy a client-server architecture, other network architectures (e.g., a peer-to-peer architecture) could also accommodate embodiments of the present invention.

A client system 12 is coupled via a network 14 (e.g., the Internet or an intranet) to a server system 16, so as to facilitate communications (e.g., utilizing any one of a number of well-known network communication protocols, such as HTTP) between the client system 12 and the server system 16. The client system 12 further hosts a number of client applications, namely an authoring tool 18 and a browser application 19 (e.g., MS EXPLORER, developed by Microsoft Corporation of Redmond, of Washington State), which supports a portal interface 20 and a content interface 22. The authoring tool 18, according to one exemplary embodiment of the present invention, is to facilitate the structuring and creation of a computer-based training course supported within the network environment 10. The authoring tool 18 may furthermore be a Java application, with a communications interface to enable the authoring tool 18 to communicate with the server system 16, as necessary.

In one exemplary embodiment, the portal interface 20 facilitates user access to a learning portal application 2 that forms one of multiple Enterprise Resource Planning (ERP) applications 34, hosted on one or more application servers 24. As will be described in further detail below, the learning portal application 2 may, inter alia, provide user access to one or more computer-based training courses, in the exemplary form of web-based training courses or standalone computer-based training courses, for example, delivered on a Compact Disk (CD).

The portal interface 20 is shown to invoke the content interface 22 within which content associated with a web-based training course is presented to a user. Specifically, the content interface 22 commutates with a content player application 4, which is responsible for the delivery of content to the content interface 22. Both the portal interface 20 and the content interface 22 communicate with the server system 16 via the network 14.

Turning now to the server system 16, one or more application servers 24 are deployed to support applications, in the exemplary form of ERP applications 34, which may include computer-based training applications (e.g., "e-learning" applications 36). The application servers 24 utilize a database server 26 to write data to, and retrieve data from, a database 28. The database 28 may, for example, store training data, in the exemplary form of e-learning data 30, and user data 32. The data 30 and 32 may be stored in any one of a number of forms, such as relational tables or as XML data structures. The application servers 24 are furthermore shown to be coupled to one or more web servers 38, so as to facilitate the delivery of web content (e.g., HTML, XML, streaming content, etc.) to the portal interface 20 and the content interface 22. The application servers 24 are also shown to have programmatic access, for example via an Application Program Interface (API) (not shown), so as to facilitate interactions between the application servers 24 and the authoring tool 18.

Figure 2:
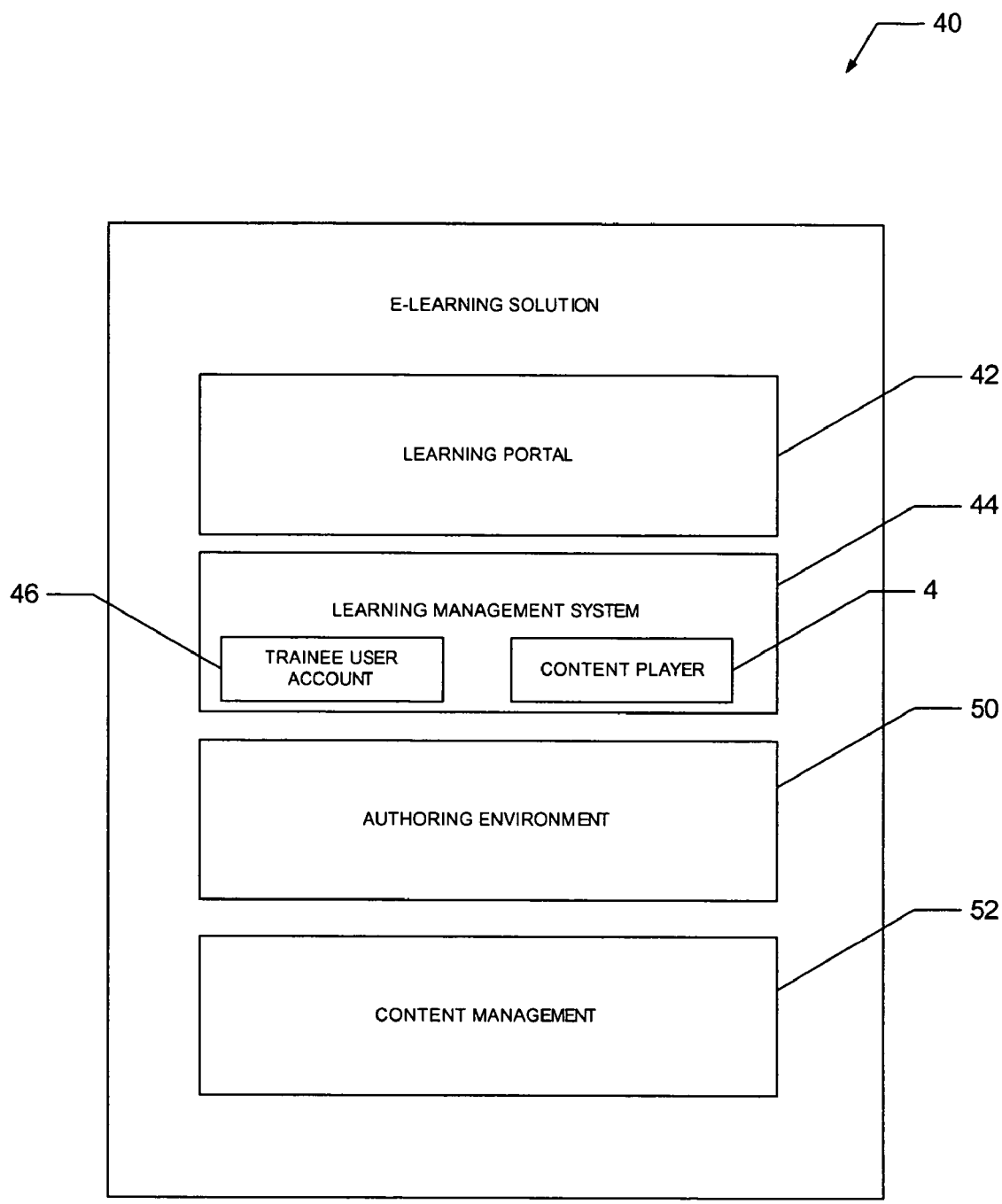
FIG. 2 is a block diagram illustrating an exemplary computer-based application in the form of an e-learning solution, within which the present invention may be implemented.

FIG. 2 is a block diagram illustrating an exemplary e-learning solution 40, within which the present invention may be implemented. The e-learning solution 40, as depicted conceptually in FIG. 2, may be supported by both client and server side components as discussed above with reference to FIG. 1. A learning portal 42 serves as a user interface to a trainee (or learner) user and, as described above, may be accessed via the portal interface 20 by a trainee user via a network (e.g., the Internet or an intranet). Depending on organization-specific adaptations, the learning portal 42 may display an overview of available course offerings, and provide details regarding organization training and education that can include in-person classroom training, virtual classroom training, web-based training, and other computer-based training. Such information regarding course offerings may include a course catalogue, course proposals, a training history, a qualifications catalogue, and qualifications profiles, which are presented in a personalized form. Further, the learning portal 42 may support online registration by a trainee user.

A learning management system 44 operates to control an individual learning (or training) process, and handles the management of administrative aspects of a training course. The learning management system 44 furthermore offers courseware authors (author users) integrated tools to structure courses and create content, and also supplies the learning portal 42 with data concerning a particular trainee user. The learning management system 44 further facilitates integration of e-learning applications with other applications that may be included within an ERP deployment. To this end, the learning management system 44 is shown conceptually to manage a trainee user account 46 by implementing a learning strategy associated with the account 46, and also tracking progress through a course, or multiple courses. The learning management system 44 is also shown to control the content player application 4 by recognizing a learning strategy associated with a particular trainee user, guiding a trainee user through a course, and determining learning progress, which is then reflected in the trainee account 46.

An authoring environment 50 is provided to courseware authors (author users) to design, create and structure modularized, reusable training content and tests, which may be web-based. Further details regarding the authoring environment 50 are discussed below.

A content management system 52 stores and manages training content, and can be accessed either by a training provider who plans and develops a course catalogue, or an author user who registers an actual course content.

Figure 3:
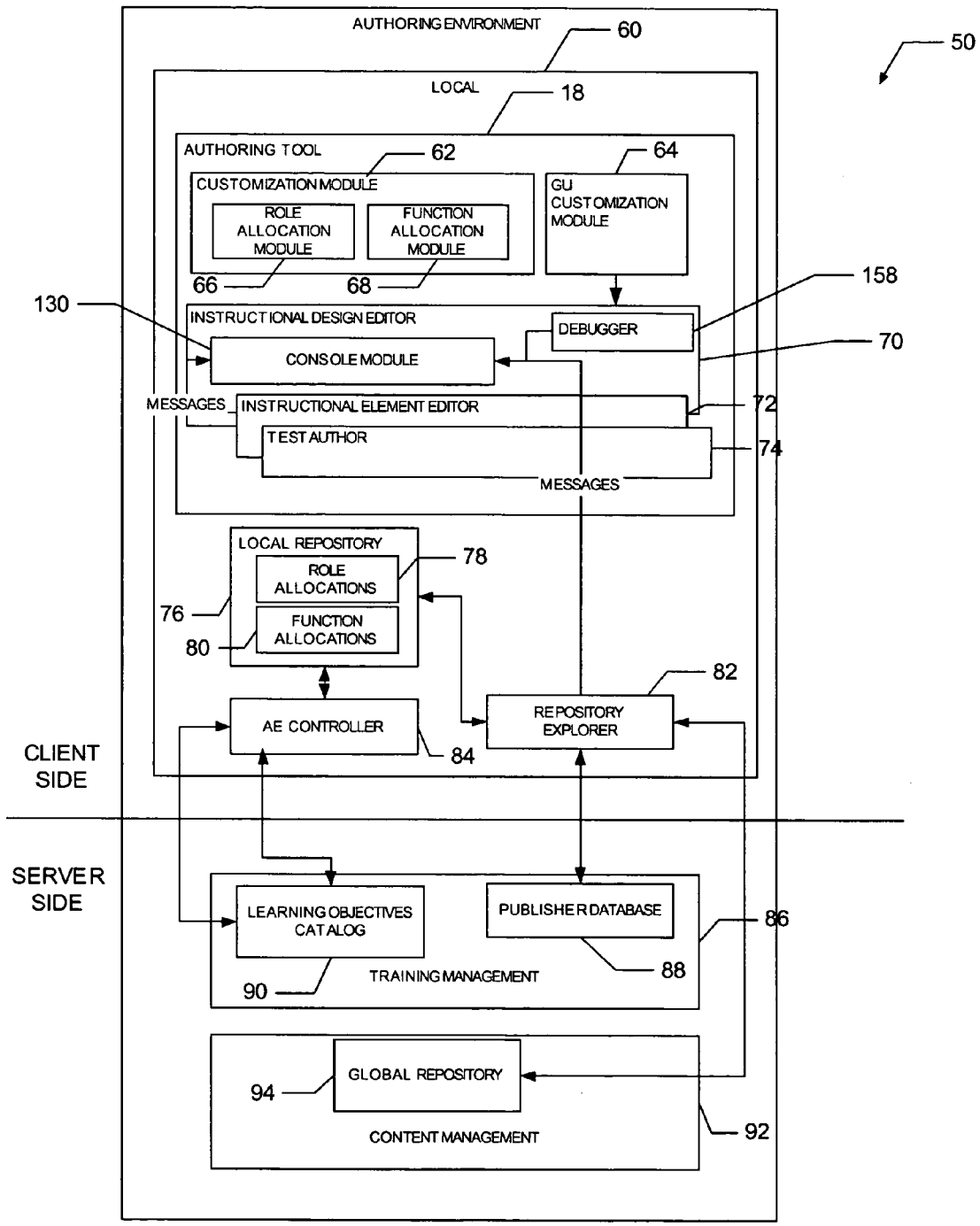
FIG. 3 is a block diagram providing further details regarding the components and elements included within the e-learning environment, according to one embodiment of the present invention.

FIG. 3 is a block diagram providing further details regarding the components and elements included within the authoring environment 50, according to one embodiment. FIG. 3 illustrates the authoring environment 50 as having a client side and a server side, with the client side components being local 60 to a client system 12, for example. As described above with reference to FIG. 1, an authoring tool 18 may reside and be hosted on a client system 12, and is shown to include a customization module 62, a GUI customization module 64, an instructional design editor 70, an instructional element editor 72, and a test author 74.

Turning first to the customization module 62, the module 62, according to an exemplary embodiment and as more fully described below, is configured to facilitate customization of the authoring tool 18. This customization extends to customization based on a user role that a particular author user may assume with respect to the authoring tool 18 (e.g., an instructional designer role or a subject matter expert role). The customization module 62 is shown to include a role allocation module 66, which operates to present a number of user-selectable roles to an author user and to record user-selection of a particular role, and a function allocation module 68, which operates to present a set of user-selectable functions to be associated with a selected role, and to record this allocation.

The GUI customization module 64 operates to customize one or more graphical user interfaces that may be presented to a user, this customization being performed based on the role allocated to a particular user. To this end, the GUI customization module 64 is shown to communicate with the instructional design editor 70, the instructional element editor 72, and the test author 74 for the purposes of customizing interfaces that may be presented by these components. While the GUI customization module 64 is shown in FIG. 3 to be separate from the components 70-74, in alternative embodiments, a respective GUI customization module 64 may form part of each of the components 70-74.

The instructional design editor 70, as noted above, is utilized by an author user for the creation and structuring of learning content for a computer-based training course. The instructional design editor 70 also includes a console module 130, which generates an error message display to display error messages received from a repository explorer 82 and the instructional element editor 72. A message resolve component, in the exemplary form of a debugger 158, also communicates with the console module 130 to retrieve and attempt to resolve error messages displayed by the console module 130, in a manner more fully described below with reference to FIG. 7.

Figure 4:
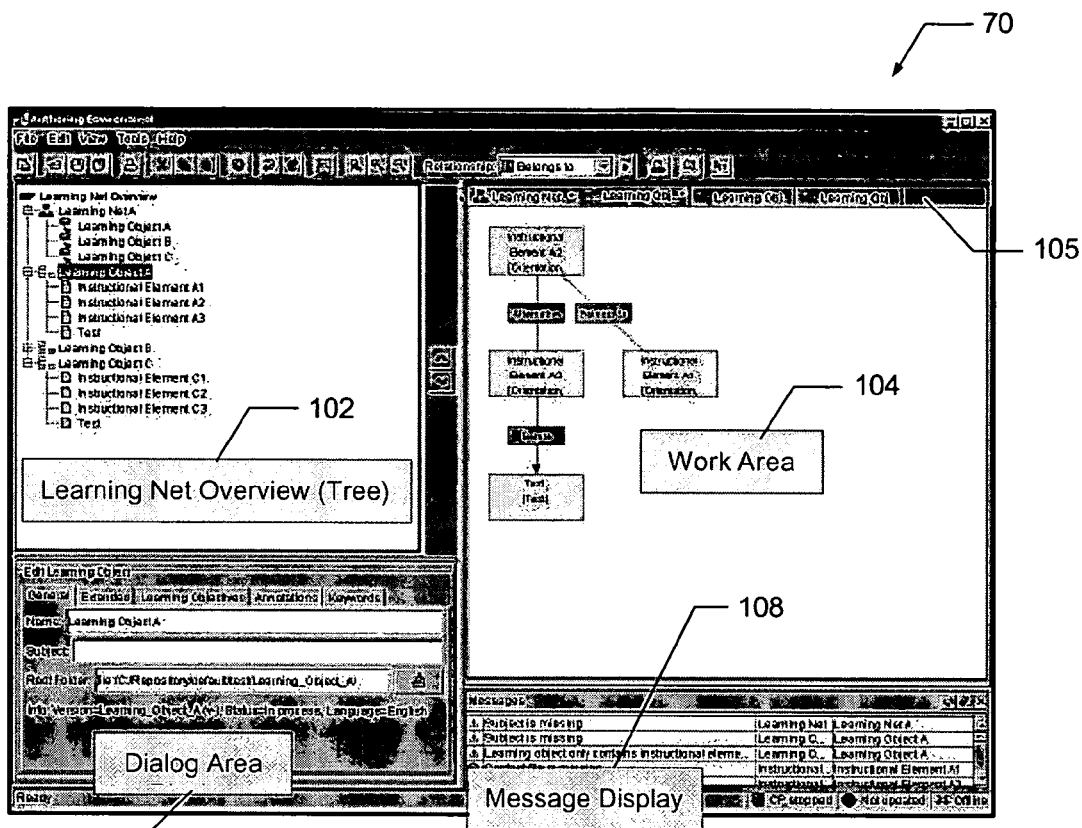
FIG. 4 is a block diagram illustrating UI components of the instructional design editor, according to an exemplary embodiment of the present invention.

FIG. 4 illustrates UI components of the instructional design editor 70, according to an exemplary embodiment. A learning net overview 102 displays learning nets (discussed in further detail below), learning objects and instructional elements in a tree structure, the various nets, objects and elements being shown in the sequence in which they were created. Units of the same kind are presented at a common level. A work area 104 provides an alternative view on the "learning net overview". Navigation between learning nets and learning objects is performed utilizing a tag strip 105 located at the top of the work area 104.

A dialog area 106 enables the editing of metadata and attributes associated with learning nets, learning objects and instructional elements.

An error message display (or console) 108 displays information, warnings, errors and fatal errors concerning learning nets, learning objects and their references, instructional elements and messages. The messages displayed in the message display 108 are received from a repository explorer 82, which is included within the authoring tool 18 and which is described in further detail below, and the instructional element editor 72.

Figure 5:
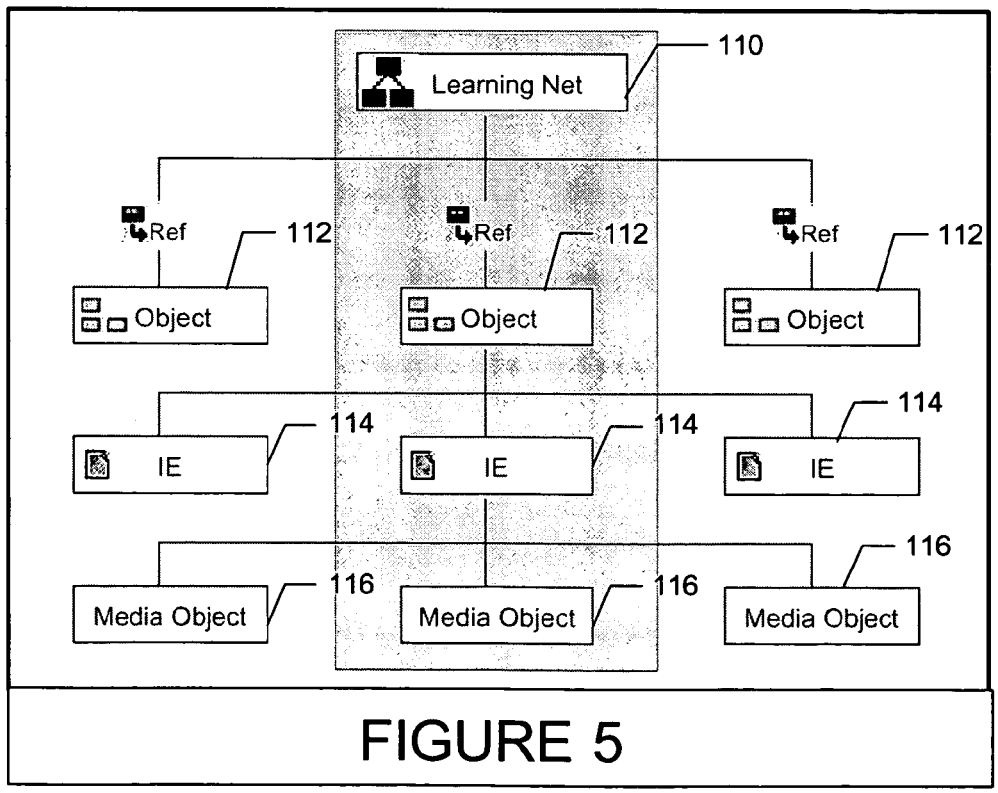
FIG. 5 is a block diagram providing details regarding a learning net, according to an exemplary embodiment of the present invention.

A training course created within the authoring environment 50 utilizing the instructional design editor 70 of the authoring tool 18 may, as noted above, conveniently be termed a "learning net". FIG. 5 is a block diagram providing further detail regarding a learning net 110, according to an exemplary embodiment. The learning net 110 is a computer-based training course created within the authoring environment 50, utilizing the authoring tool 18. The learning net 110 is comprised of learning objects 112, instructional elements (IEs) 114 and tests, which may include one placement and one final test.

Each learning object 112 is a shell that may comprise multiple instructional elements 114, and optionally tests dealing with a particular subject. A learning object 112 may be self-contained, independent and reusable. Furthermore, each learning object 112 includes didactical and technical metadata.

An instructional element 114 is the smallest didactical unit in a learning net 110, and may comprise actual course content viewed by a trainee user. In addition to attributes (e.g., knowledge category, media type, etc.), each instructional element 114 is assigned a source file containing editable content, and a content file holding a viewable content in a displayable format.

A test may be an independent part of learning content at the level of a learning object 112, or a learning net 110. It is envisaged that multiple different types of tests may be included within learning content.

It will also be noted from FIG. 5 that learning nets 110 and learning objects 112 may contain links to other learning nets, learning objects or media objects within a repository. The connection between a learning net and its object (or subnets) is obtained through such references. Attributes assigned to a reference may differ from those stored within a particular object.

The authoring tool 18 may be utilized to design and create computer-based (e.g., both online and offline) training courses. To this end, the authoring tool 18 includes the three above-described editors, namely the instructional design editor 70 for creating and structuring learning content, the instructional element editor 72 for creating learning content (a.k.a., instructional elements), and the test author 74 for creating integrated common object-oriented tests and certification for assessment purposes.

The instructional element editor 72, in one exemplary embodiment, presents format templates to enable a uniform presentation of texts, into which hyperlinks and email links can be integrated. Supported formats that may be included within a computer-based training course include Flash, MS PowerPoint, MS Word, MS Excel, PDF, element and background graphics, and main and background audio and video. To support novice author users, the instructional element editor 72 may include one or more wizards (not shown) to lead the author user through a page creation and layout process on the basis of a variety of questions that are presented to the author user. These questions may serve to define a type and purpose of an instructional element, as well as the type of content to be included.

Returning now to FIG. 3, and specifically to the test author 74 included within the authoring tool 18, the test author 74 is a tool for planning, designing, creating and managing tests and feedback measures. Appraisals and evaluations of a trainee user's skills or knowledge enable a test environment to individually adapt and monitor a learning process, and also to evaluate a learning process and success thereof.

The authoring tool 18 also includes a local repository 76, which is a directory structure of a local hard drive where all the locally created objects (e.g., learning nets, learning objects and instructional elements) are stored. Configuration information pertaining to the authoring environment 50 includes role allocation and function allocation data structures 78 and 80, the data structures 78 and 80 having been created by the role allocation and function allocation modules 66 and 68, respectively. The role allocation and function allocation data structures 78 and 80 are accessed by the GUI customization module 64 so as to enable the GUI customization module 64 appropriately to customize interfaces presented via the components 70-72, as presented to an author user. In various embodiments of the present invention, the role allocation and function allocation data structures 78 and 80 may comprise database tables of central database (e.g., relational tables), or other data structures such as an XML data structure.

FIG. 3 also shows that a global repository 94 may be maintained on the server side of the authoring environment 50, as part of a content management system 92. The global repository 94 is a central storage location for learning nets, learning objects and media objects, which are accessible to multiple author users. The repository explorer 82, in one embodiment, operates to transfer data between a local repository 76, where course content may be displayed and edited, and the global repository 94, which is accessible to all author users.

Moving on now to the server side of the authoring environment 50, and specifically to a training management component 86, a learning objectives catalogue 90 stores a collection of learning objectives (not shown) which may be assigned to learning nets and learning objects in order to establish a trainee user's level of knowledge. A learning objectives manager (not shown) is utilized to manage and define learning objects.

According to one embodiment of the present invention, the authoring tool 18 may support the allocation of at least one of multiple roles to an author user. Certain functions may be deactivated according to a specific role assigned to an author user. Further, two or more views may be presented, via the components 70-74, between which an author user may switch if necessary.

Figure 6:
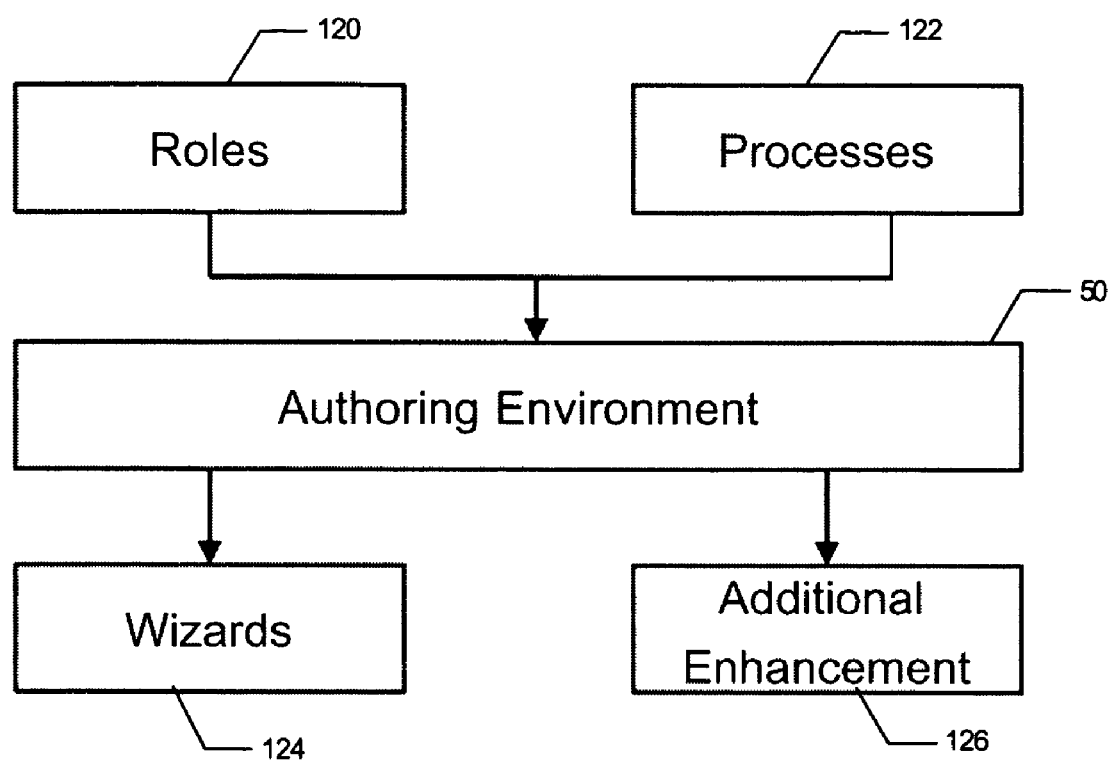
FIG. 6 is block diagram illustrating processes that provide input to, and receive output from, an exemplary authoring environment.

A roles-based approach enables the mapping of certain functions onto tasks for each author user's role. Further, an author user who has outgrown his or her role can switch to an advanced role, at his or her discretion. FIG. 6 is a block diagram illustrating roles 120 and processes 122 mapped into the authoring environment 50, thus enabling role-based customization of views, according to functions associated with such roles. Accordingly, a role may be viewed as serving as a foundation for access control and a functionally adapted view, with hidden functions being available for re-activation utilizing the customization module 62 described above. The definition of roles may be implemented using wizards 124, or additional enhancements provided by the customization module. The customization of user interfaces, as enabled by the customization module 62, and as implemented by the GUI customization module 64, enable, in one embodiment, an author user manually to select or deselect individually favored functionality. Offering an author user several customizing options is advantageous in that the author user is provided with the capability to alter the authoring tool 18 to meet personal requirements. While the customizing of an application, such as the authoring tool 18, typically requires an intimate knowledge of the application to be customized, the customization process may be simplified by classifying functions that may be associated with a particular role as either being default associated with the role, default non-associated with the role, but selectable, and functions which cannot be associated with a particular role.

In today's fast moving business world, the complex task of developing training courses for multimedia learning typically cannot be completed single handedly. Accordingly, a project team is often assigned to the task of creating a training course.

Within the planning and design phase, a project manager coordinates the development team and also accounts for budgeting, time management, and operational and strategic planning. An instructional designer may assume many of the responsibilities of a project manager, and is primarily focused on the development of a methodical design of a computer-based training course. A scriptwriter may be an expert in didactics, and is responsible for the creation and administration of a script. In consultation with the multimedia developers, a scriptwriter may decide on words, images, video and audio elements, as well as providing navigational directions, special functions, links and other software behavior definitions.

Turning now to the content creation phase, a subject matter expert (who may also be referred to as a content expert) creates material for the computer-based training course in order to impart knowledge and to place tests. Multimedia developers are typically graphic artists, audio producers and video producers, who may form part of a broader multimedia development team. A graphic artist may work on the design of a user interface (e.g., screen layout, as well as single items such as buttons, windows, menus or other specific graphics, animations, diagrams or photography). An audio and/or video producer conducts a complete production process for video and/audio elements. A programmer processes the deliverables of the subject matter experts, by creating actual media content by integrating the work of the graphic artist, and audio and video producers. Programmers often work with authoring tools and HTML.

Subsequent to the content creation phase, one or more translators may be responsible for the translation into one or more languages. A quality reviewer/editor may, throughout an entire development process, continue to check the computer-based training program (e.g., check the functional quality, content accuracy, logic, inconsistencies, performance, operability, accessibility and usability).

The above-described roles are merely examples of roles that may be defined within a team that is tasked with the design and creation of a computer-based training program. The above roles are described as example of roles to which sets of functions may be allocated, and according to which a graphical user interface may be customized.

Figure 7:
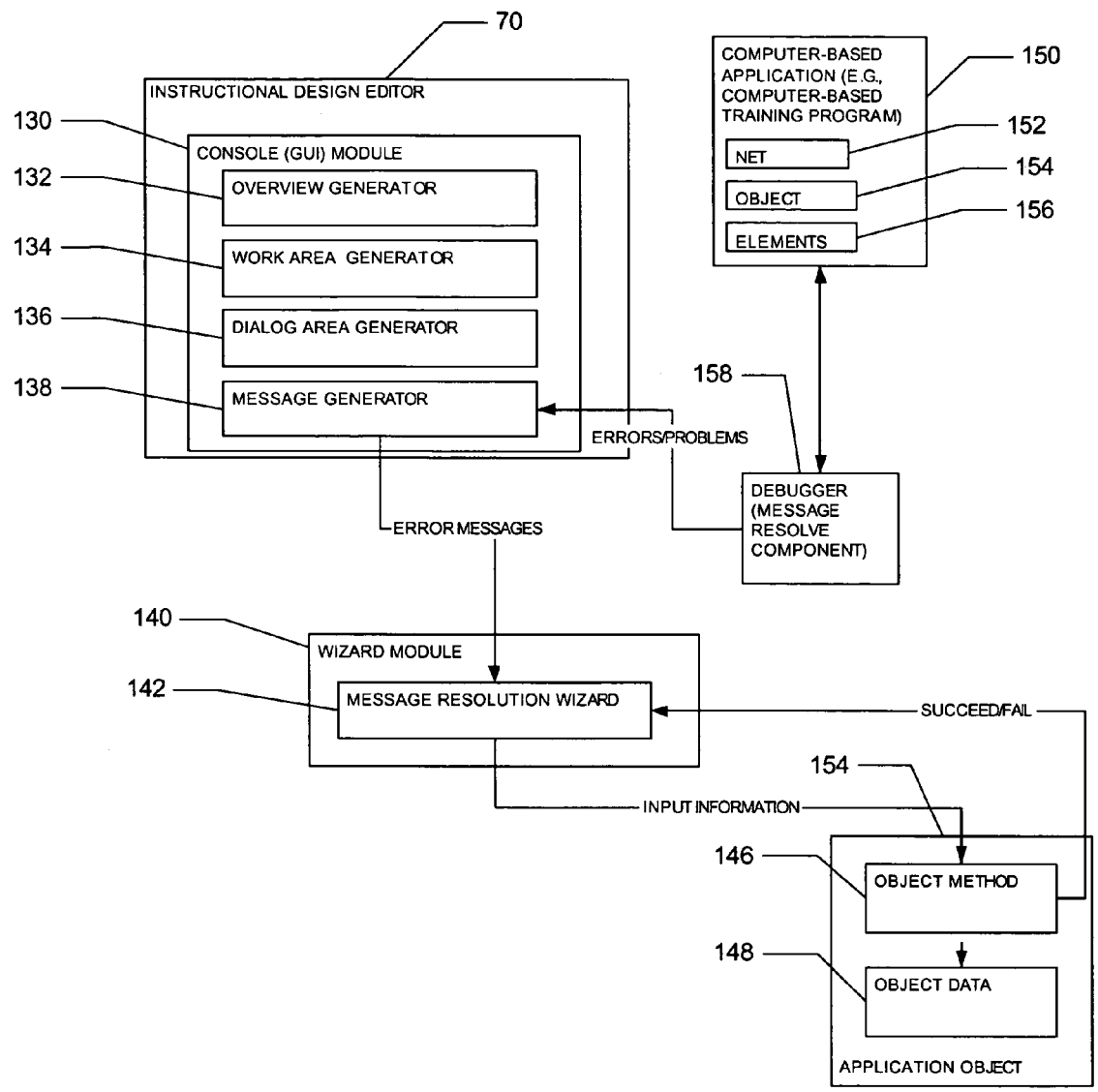
FIG. 7 is a block diagram illustrating architectural details of an instructional design editor, according to an exemplary embodiment of the present invention, and illustrates a message resolution wizard communicating input information to an application object.

FIG. 7 is a block diagram illustrating architectural details of the instructional design editor 70, according to one embodiment. A console (or GUI) module 130 includes an overview generator 132 to generate the learning net overview 102 (see FIG. 4), a work area generator 134 to generate the work area 104 (see FIG. 4), a dialog area generator 136 to generate the dialog area 106 (see FIG. 4) and a message generator 138 that is responsible for the generation of the error message display 108 (see FIG. 4). Accordingly, the message generator 138 is responsible for receiving (or in one embodiment itself identifying) information, warnings, errors and fatal errors, for example, concerning learning nets, learning objects and their references, instructional elements and messages within the instructional design editor 70.

FIG. 7 also illustrates a wizard module 140 that, in one exemplary embodiment, includes a number of wizards, including a message resolution wizard 142. As shown, the message resolution wizard 142 is configured to receive error messages from the message generator 138, and to process these error messages, as will be described in further detail below, to assist a user in resolving errors or problems that underlie the various error messages.

The message resolution wizard 142 also communicates input, for example received from a user, to an object method 146, of an application object 154. The method 146 attempts to convert the input into required object data 148, for example, in order to resolve the error or problem underlying a particular message. The object method 146 may also, in one embodiment, provide a succeed/fail indication back to the message resolution wizard 142 so as to enable the message resolution wizard 142 to determine whether the underlying error or problem has been successfully addressed or resolved by the provided input.

FIG. 7 also illustrates that the messages may, in one embodiment, be generated by the message generator 138 responsive to the receipt of identification of these errors (or problems) from a debugger 158 that performs a debugging operation with respect to a computer-based application (e.g., a computer-based training program, that includes training nets 152, objects 154 and elements 156).

Figure 8:
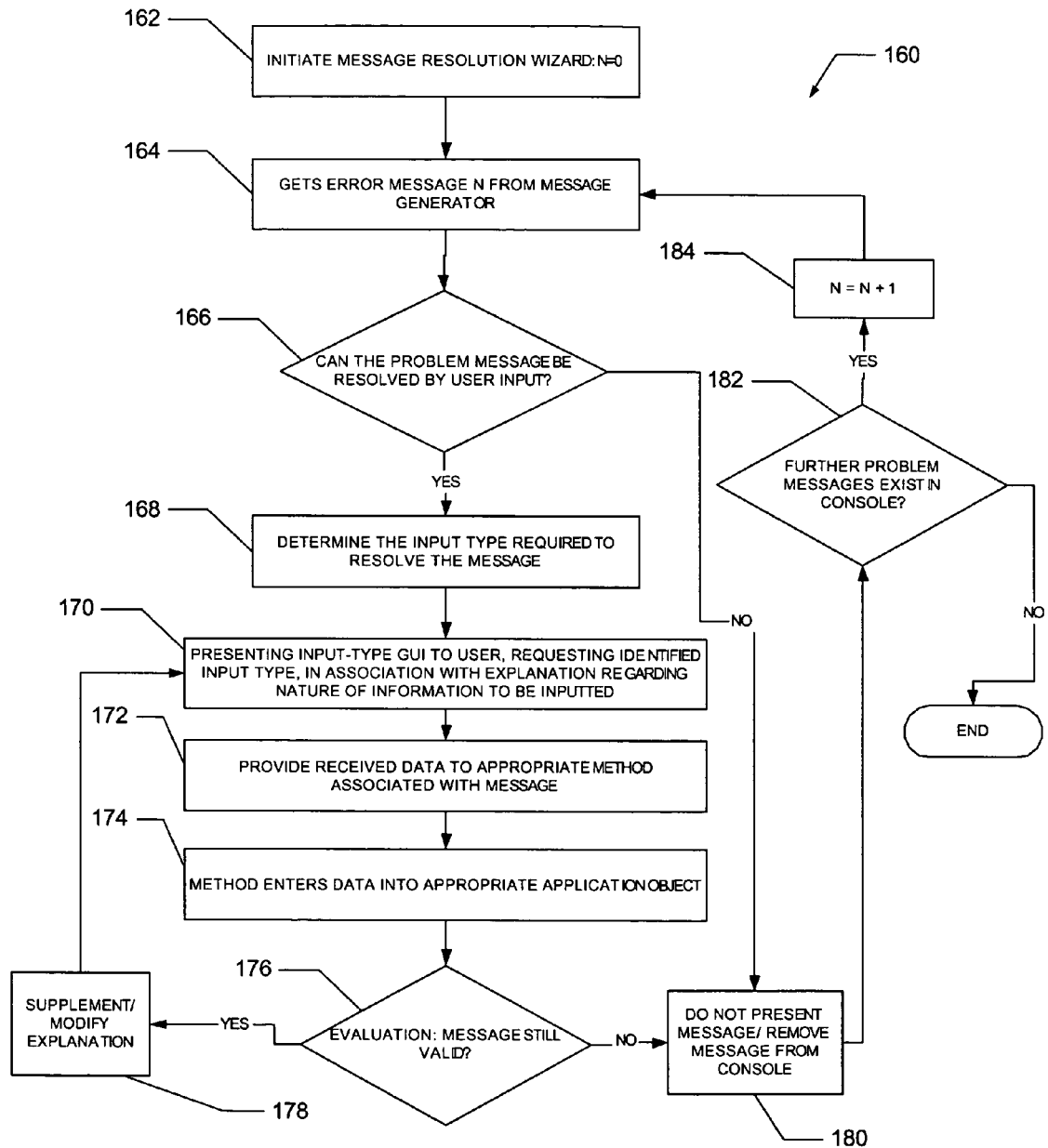
FIG. 8 is a flowchart illustrating a computer-implemented method, according to an exemplary embodiment of the present invention, to resolve errors pertaining to a computer-based application.

FIG. 8 is a flowchart illustrating a method 160, according to an exemplary embodiment, to resolve or address an error or problem pertaining to a computer-based application, which may be identified by an error message presented to a user within the instructional design editor 70. Again, the present invention is not limited to an embodiment in which error messages are presented within a console, and may find application in any system in which errors are identified and/or communicated.

Figure 9:
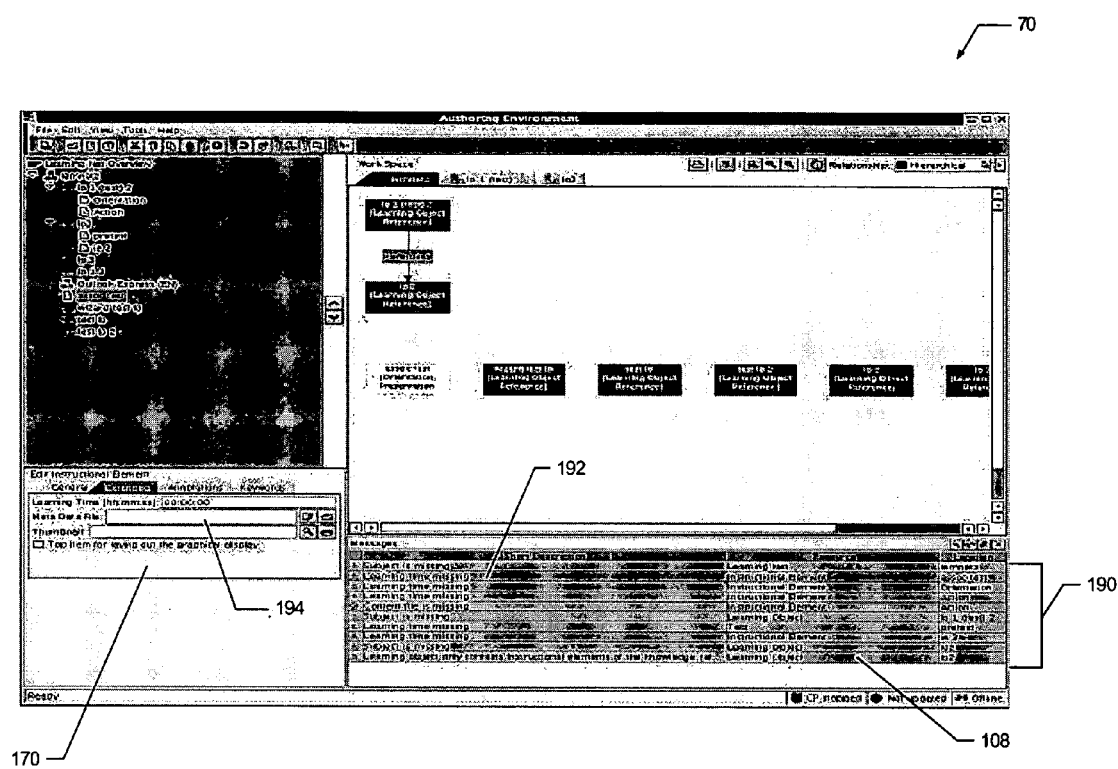
FIGS. 9-15 illustrate a series of interfaces, according to an exemplary embodiment of the present invention, which may be presented to facilitate the method to resolve errors pertaining to a computer-based application.

Before describing the exemplary method 160, it is useful to further consider the challenges faced by a user when presented with a list of error messages within the instructional design editor 70. FIG. 9 shows an exemplary instance in which the GUI components of the instructional design editor 70, and specifically the error message display 108, present a list 190 of error messages to a user, the error messages pertaining to a computer-based application (e.g., to the learning nets, learning objects, instructional elements etc. of a computer-based training course). Each error message within the list 190, as displayed within the error message display 108, includes a short description of the error (e.g., identifying certain information that is missing), a resource to which the error message pertains (e.g., a net element or object), and a location of the relevant resource. User selection of a particular error message 192 results in the display, within the dialog area 106, of one or more input fields 194 into which a user may input information in order to address or resolve the problem or error underlying the error message 192. Consider now that the user (e.g., a user assigned to an instructional designer role) may not be sufficiently familiar with the underlying architecture of the authoring environment 50 to fully understand what input is required, or the format, type, location etc. of the required input information. Accordingly, the "manual" resolution of errors for which error messages appear within the message display 108 may present a number of challenges to an unqualified (e.g., new) user of the instructional design editor 70.

Figure 10:
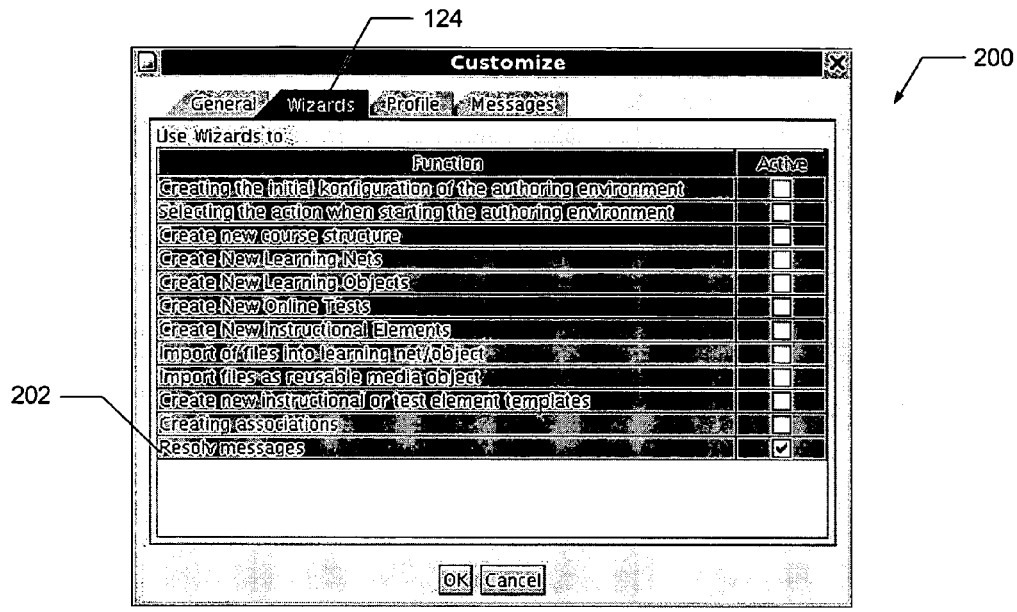

Returning to FIG. 8, the method 160 seeks to assist a user in the resolution of errors pertaining to a computer-based application. The exemplary method 160 commences at operation 162 with the initiation (e.g., a manual or automatic initiation) of a message resolution wizard 142, which may set a loop variable N to zero (0), the loop variable identifying a relevant error message within a list 190 of error messages that are being processed by the message resolution wizard 142. FIG. 10 illustrates an exemplary interface 200 that may be generated by the wizard module 142 to present a selection of wizards to a user. As shown, a user may invoke the message resolution wizard 142 by activating an appropriate UI element 202 within the interface 200.

At operation 164, the message resolution wizard 142 retrieves error message N from the message generator 138 and, at decision operation 166, determines whether the input required to resolve an error (or problem) underlying the error message exceeds a predetermined level of complexity. The determination made at decision operation 166 may involve an analysis of one or more parameters. For example, in one embodiment, determination may be made whether the problem message can in fact be resolved by user input. A component of this analysis may be a determination whether the user, to which the error message is presented, in fact has, or would likely have, the required skill set, level of expertise, and/or knowledge, for example, to provide the input required to resolve the error or problem. Specifically, as the user to which the error message is presented by the message resolution wizard 142 will have logged into the authoring environment 50, the environment 50 will be aware of the identity of the user. Accordingly, the message resolution wizard 142, being aware of the identity of the user, may access a database table that stores information indicative of the qualifications and skill levels of the user. This qualification information, pertaining to the logged-in user may be utilized to make the determination at operation 166.

Further, as discussed in some detail above, the logged-in user may have been assigned one or more roles within the authoring environment 50. An assigned role will again of course be determinable by the message resolution wizard 142, as a result of the user log in. The role (or roles) that have been attributed to the logged-in user may accordingly also be utilized by the message resolution wizard 142 to determine whether the user is qualified to provide the input information to resolve the problem underlying the error message. For example, where the user has been allocated to a "subject matter expert" role, the message resolution wizard 142 may, at operation 166, determine that the user may be unqualified to provide the input required to resolve the problem or error.

In addition to examining the qualifications of a logged-in (or otherwise identifiable) user to which an error message is presented, the message resolution wizard 142 may, at operation 166, also determine whether the complexity of the input required to resolve the problem is such that it cannot conveniently be solicited from, or provided by, the logged-in user. For example, the message resolution wizard 142 may determine that more than a certain number of distinct data items are required to resolve the problem and, on this basis, determine that the input exceeds the predetermined level of complexity. For example, the input to resolve the error may be the values for a number of parameters across a number of objects of a computer-based application. Accordingly, the determination at operation 166 may include determining whether the underlying problem or error pertains to more than one object of the computer-based application. Further, the complexity of the input may be influenced by relationships between various parameters. For example, a first input value, for a first parameter, may influence a second input value for a second parameter. Knowledge of such dependencies may be beyond the skill level of a logged-in user, and the input (e.g., input that requires knowledge of dependencies) may be identified as such at operation 166.

The determination at operation 166 may furthermore include an assessment of the type of input required to resolve, or address, the underlying problem. For example, certain input types (e.g., complex expressions), may be deemed to have too high a level of complexity to be resolved by input from the logged-in user, whereas other input types (e.g., time, date information) may be regarded as sufficiently simple to be resolvable by input from the logged-in user.

At operation 168, the message resolution wizard 142 may determine the input type required in order to resolve the problem, for the purposes of displaying an input-type graphical user interface (GUI). Having determined the input type (e.g., time or date information) at operation 170, the message resolution wizard 142 presents an input GUI, specific to the input type, to a user. The presented input GUI, inter alia, includes an input field to receive an identified input type. The input GUI further presents associated explanation information that is provided in conjunction (or association) with the input field(s). The explanation information, in one embodiment, is commensurate with the level of complexity of the input and/or the skill levels/qualifications of the logged-in user. Accordingly, in one embodiment, the message resolution wizard 142, in presenting the input GUI, may access a table of explanation information (not shown) that may include, for each error message type, a number of different explanation data item, each tailored to the complexity of the problem and/or the qualifications of the user. For example, where the logged-in user is allocated a role that is deemed to be less qualified with respect to a particular problem, the explanation data item selected for presentation within the input GUI may be relatively comprehensive.

Figure 11:
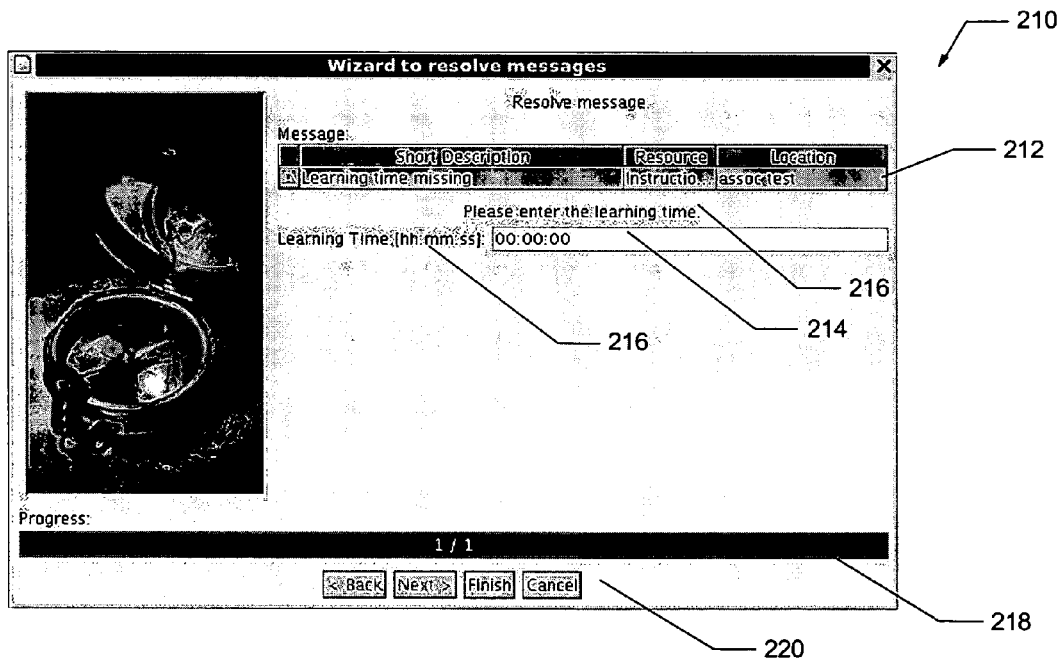

FIG. 11 is a screen shot illustrating an input GUI 210, according to one embodiment, which may be presented by the message resolution wizard 142 at operation 170. The input GUI 210 includes a concise message bar 212, which in turn provides a short description of the underlying problem, an identification of the resource to which the problem pertains, and a location of the relevant resource. In addition to the summary information provided in the bar 212, the input GUI 210 includes one or more input fields 214 to receive, for example, values to be attributed to one or more variables. Explanation information 216 is provided in conjunction with the input field 214, so as to provide the logged-in user with some guidance regarding the input values to be provided into the input field 214. While the example shown in FIG. 11 is relatively simple, it will be appreciated that the explanation information 216 may be fairly comprehensive, dependent on the complexity of the input required and the qualifications of the logged-in user. The input GUI 210 is further shown to include a progress bar 218 that provides (1) an indication of a user's progress through messages that have identified as being resolvable by user input, and also (2) a collection of navigation buttons 220 utilizing which a user may navigate through a list of error messages.

Figure 12:
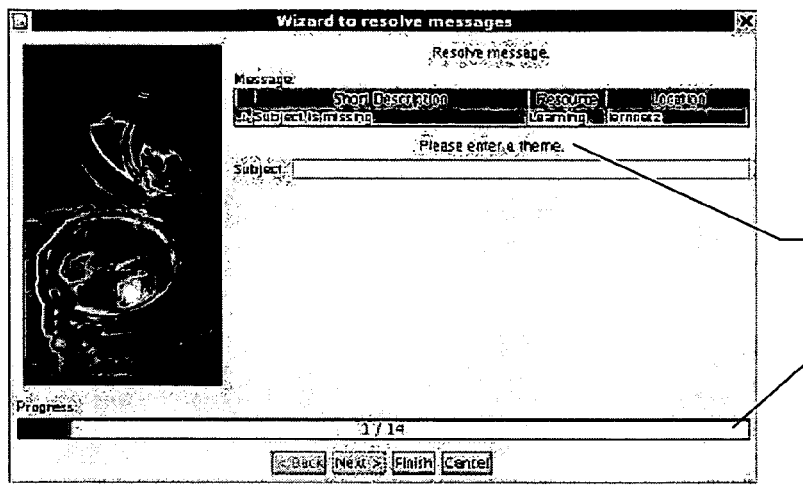
Figure 13:
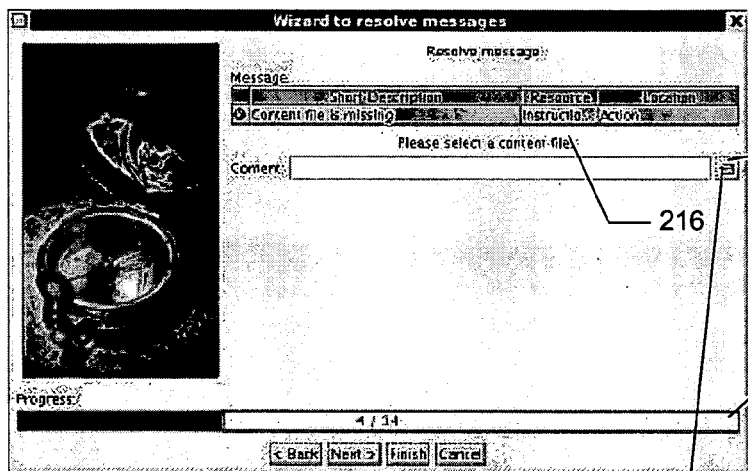
Figure 14:
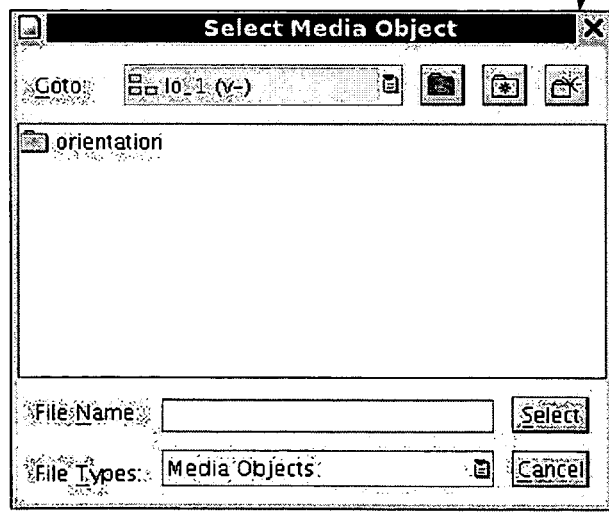

FIGS. 12-14 are screen shots of further exemplary interfaces that may be presented at operation 170. Specifically, FIG. 12 illustrates an exemplary input GUI 210, in which the explanation information 216 prompts the user to "Please enter a theme", in this way providing the logged-in user with additional guidance regarding the text input to be provided into the input field 214. FIG. 13 illustrates a further exemplary input GUI 210, in which the input explanation information 216 explains to a logged-in user that selection of a content file is required. In this example, the explanation information provided in conjunction with the input field includes a media selection button 222 that is user-selectable to invoke an exemplary select media object GUI 224, illustrated in FIG. 14. The select media object GUI 224 facilitates user navigation to, and selection of, a file that may reside on the user's computer, or on a network to which the user is coupled. Accordingly, the media selection button 222 provides an example of supplementary information, or a supplementary mechanism, that may be included in the explanation information and that may be presented by the message resolution wizard 142 to assist a user in identifying and locating input to be provided to resolve a problem or error.

Figure 15:
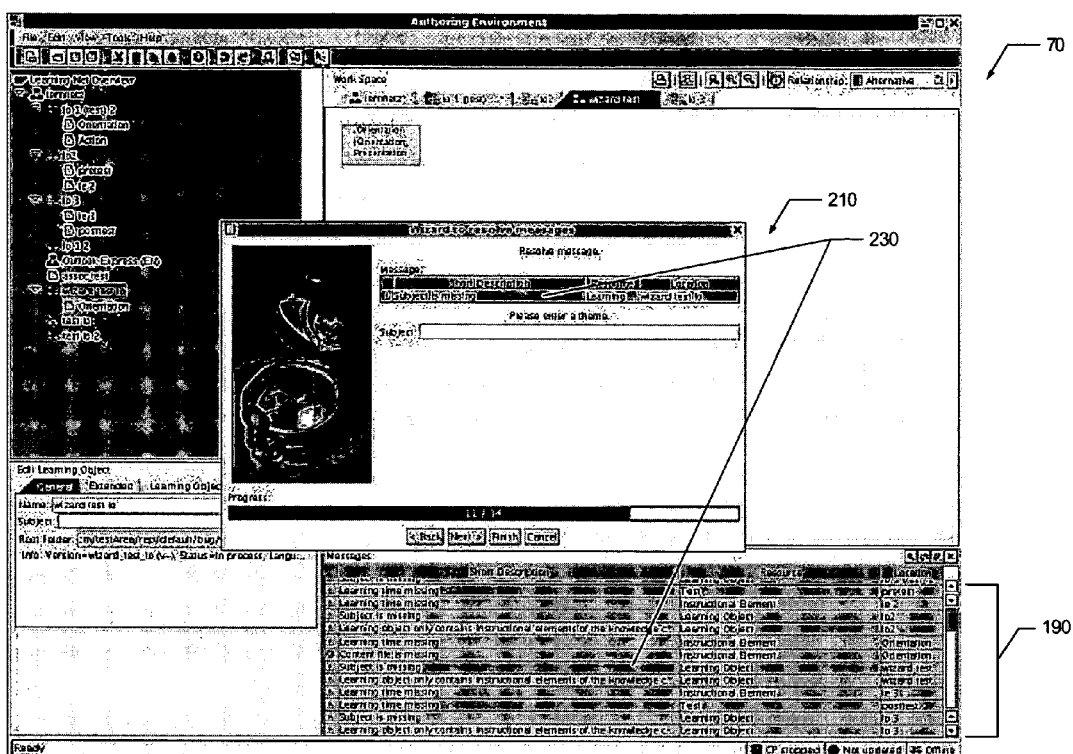

FIG. 15 is a further screen shot illustrating exemplary interfaces presented by the instructional design editor 70 and the message resolution wizard 142. The messages displayed for resolution within the input GUI 230 are synchronized with an identification of corresponding messages within the message display 108, containing the list 190 of error messages 192. In this way, the logged-in user is provided a visual indication of his or her progress through the list 190.

Returning now to the method 160 illustrated in FIG. 8, at operation 172, the message resolution wizard 142 provides the received input information to an appropriate object method of 146, to which the error pertains, as illustrated in FIG. 7.

At operation 174, the object method 146 enters the received input information to an appropriate application object 154.

At decision operation 176, a determination is made whether the relevant error (or problem) is still valid (e.g., an evaluation is made whether the error message is still valid or not). For example, the message resolution wizard 142 may invoke the debugger 158 to determine whether the input information resolves the error or problem. In the embodiment in which the object method 146 performs the evaluation, the object method 146 may communicate a succeed/fail indication to the message resolution wizard 142 so as to enable the message resolution wizard 142 to evaluate whether a particular error message is still valid or not. For example, where required time/date data is missing with respect to a particular application object 154, the input information may or may not have been provided within an acceptable range or in an acceptable format.

If it is determined at decision operation 176 that an underlying problem or error has in fact not been resolved, and that the relevant error message is accordingly still valid, the method 160 then progresses to operation 178. The explanation information presented within the input GUI may then be supplemented or modified in light of the failed attempt to resolve the error. Specifically, in one embodiment, the message resolution wizard 142 may provide further information to address a recognized problem with the received input information. Again, returning to the date/time input example, where the provided date/time information is outside an acceptable range, the explanation information may be supplemented to indicate the acceptable range. Where the input information did not comply with format requirements, a further explanation regarding format requirements may be provided.

Following operation 178, the method then loops back to operation 170, where the input GUI 210 may again be presented to the user, including the supplemented or modified explanation information. In one embodiment, the method 160 may loop a predetermined number of times through operations 170-178. If the input information cannot be successfully solicited after this predetermined number of loops, the method 160 may then identify the problem as being of too greater complexity for resolution by user input (e.g., the method 160 may return to decision operation 166, and a negative determination may be made).

Following negative determinations at either of decision operations 166 or 176, the method 160 progresses to operation 180, where the message resolution wizard 142 either removes the message from the list 190 of messages presented within the message display 108 (e.g., as a result of the problem having being resolved) or does not present an input GUI 210 for the relevant error (e.g., where the complexity of the input or the problem is beyond a threshold complexity level).

From operation 180, the method 160 progresses to operation 182 where the message resolution wizard 142 determines whether any further errors (e.g., for which error messages exist within the list 190). If so, at operation 184, the loop variable N is incremented by one (1), and the method 160 loops back to operation 164. On the other hand, should no further errors (or problems) exist for presentation by the message resolution wizard 142, the method 160 then terminates.

Accordingly, in one embodiment, the message resolution wizard 142 serves to progressively step through a list of errors or problems (e.g., represented by error messages), and, for each problem, determines whether it is resolvable by user input, subject to certain constraints. If so, the message resolution wizard 142 may present a sequence of input GUIs 210, supplemented with explanation information and tools to assist the user in resolving the relevant errors. If a particular problem is deemed to not be resolvable by user input, subject to the constraints, the message resolution wizard 142 will not prompt the user for input information. Accordingly, the message resolution wizard 142 may progressively determine whether input, to resolve each of a number of errors in a list of errors, exceeds a respective level of complexity, and only presents those errors, from the list of errors, that are deemed to be resolvable by input that does not exceed a respective, and predetermined, level of complexity.

In one embodiment, a potentially distinct set of criteria (or constraints) is applied to each error (or problem) to assess whether the input required for that particular error (or problem) exceeds a predetermined level of complexity. Accordingly, the level of complexity is determined on a case-by-case basis. In another embodiment, a global level of complexity may be applied across a number of errors.

Figure 16:
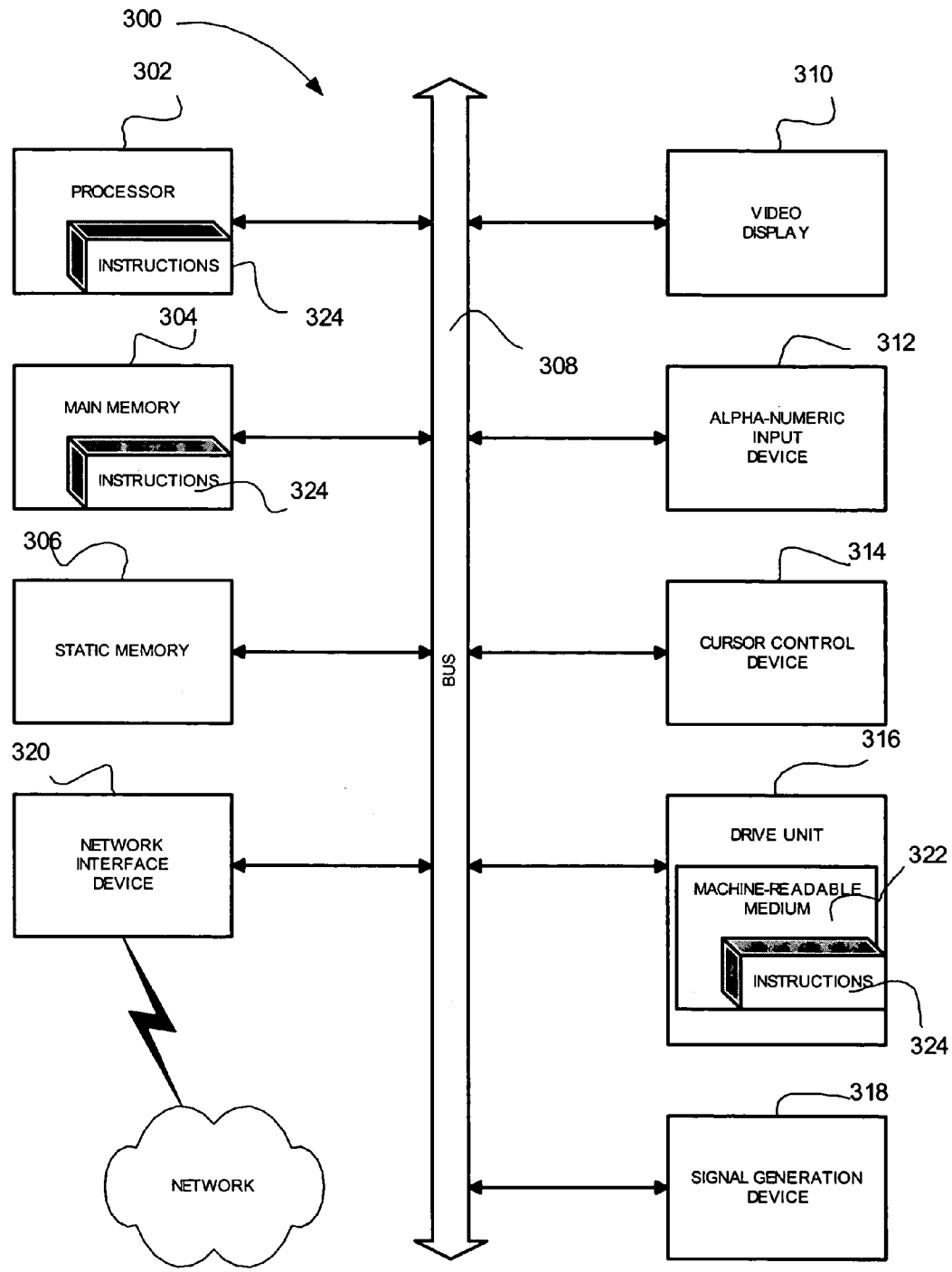
FIG. 16 shows a diagrammatic representation of machine in the exemplary form of a computer system within which a set of instructions, for causing the machine to perform any one or more of the methodologies discussed herein, may be executed.

FIG. 16 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Thus, a method and system for resolving error messages in a computer-based application have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system to resolve errors pertaining to a computer-based application, the system comprising:
   one or more processors and a memory;
   an error identification component stored in the memory to cause at least one of the one or more processors to identify an error pertaining to the computer-based application;
   an error resolution component stored in the memory to cause at least one of the one or more processors to automatically determine whether input to resolve the error, pertaining to the computer-based application, exceeds a level of complexity based on at least one of qualification information pertaining to a user, a number of data items requiring input, or a number of objects of the computer based application to which the error pertains and;
   an output device to output the error in conjunction with an input field to receive input from an input device to resolve the error if the input to resolve the error is determined not exceed the level of complexity.

2. The system of claim 1, wherein the error identification component is a debugger that operationally debugs the computer-based application.

3. The system of claim 1, wherein the error is one in a list of errors, and wherein the error resolution component is progressively to determine whether input to resolve each error in a list of errors exceeds a respective level of complexity.

4. The system of claim 3 where the error resolution component is to output only errors, from the list of errors, that are resolvable by respective inputs that do not exceed the respective level of complexity.

5. The system of claim 1, wherein the level of complexity is further based on a user role with respect to the computer-based application.

6. The system of claim 1, wherein the error resolution component is to determine whether the input comprises more than a predetermined number of distinct data items.

7. The system of claim 1, wherein the computer-based application is an object-oriented application and the error resolution component is to determine whether the error pertains to more than one object of the computer-based application.

8. The system of claim 1, wherein the error resolution component is to provide explanation information pertaining to the input to be received into the input field to resolve the error.

9. A computer-implemented method to resolve errors pertaining to a computer-based application, the method including:
   automatically determining whether input to resolve an error, pertaining to the computer-based application, exceeds a level of complexity based on at least one of qualification information pertaining to a user, a number of data items requiring input, or a number of objects of the computer based application to which the error pertains and, if not, then outputting the error in conjunction with an input field to receive input to resolve the error.

10. The method of claim 9, including presenting a list of errors, including the error, within a user interface by invoking an error resolving wizard application that progressively determines whether input to resolve each of the errors in the list of errors exceeds a respective level of complexity.

11. The method of claim 10, including presenting only errors, from the list of errors, that are resolvable by input that does not exceed the respective level of complexity.

12. The method of claim 9, wherein the level of complexity is further based on a user role with respect to the computer-based application.

13. The method of claim 9, wherein the method includes automatically determining whether the input comprises more than a predetermined number of distinct data items.

14. The method of claim 9, wherein the computer-based application is an object-oriented application, and the method includes determining whether the error pertains to more than one object of the computer-based application.

15. The method of claim 9, wherein the presenting of the error includes providing explanation information pertaining to the input to be received into the input field to resolve the error.

16. The method of claim 9, wherein the computer-based application is an object-oriented application, and the method includes providing the input to an object method of the computer-based application that is associated with the error.

17. The method of claim 16, wherein the object method provides the input to an application object of the computer-based application.

18. The method of claim 9, including utilizing the input in an attempt to resolve the error pertaining to the computer-based application, determining whether the error has been resolved by the input, and, if not, then outputting again the error in conjunction with the input field.

19. The method of claim 18, wherein the outputting again includes providing the user with modified explanation information pertaining to the input to be received into the input field to resolve the error.

20. The method of claim 18, wherein, if the error has been resolved by the input, then removing the resolved error from a list of errors.

21. A system to resolve errors pertaining to a computer-based application, the system including:
first means stored in a memory for identifying an error pertaining to the computer-based applications;
second means for storing the identified error; and
third means stored in a memory for automatically determining whether input to resolve the error, pertaining to the computer-based application, exceeds a level of complexity, based on at least one of qualification information pertaining to a user, a number of data items requiring input, or a number of objects of the computer based application to which the error pertains, and;
fourth means for outputting the error in conjunction with an input field to receive input from the user to resolve the error if the input to resolve the error is determined not to exceed the level of complexity.

22. A computer-readable storage medium storing a set of instructions that, when executed by a machine, cause the machine to perform a method to resolve errors pertaining to a computer-based application, the method including:
automatically determining whether input to resolve an error, pertaining to the computer-based application, exceeds a level of complexity based on at least one of qualification information pertaining to a user, a number of data items requiring input, or a number of objects of the computer based application to which the error pertains; and
if not, then outputting the error in conjunction with an input field to receive input from the user to resolve the error.

23. The media of claim 22, further comprising instructions that, when executed by a machine, cause the machine to perform a method further comprising:
presenting a list of errors, including the error, within a user interface by invoking an error resolving wizard application that progressively determines whether input to resolve each of the errors in the list of errors exceeds a respective level of complexity.

24. The media of claim 23, further comprising instructions that, when executed by a machine, cause the machine to perform a method further comprising:
presenting only errors, from the list of errors, that are resolvable by input that does not exceed the respective level of complexity.

25. The media of claim 22, wherein the level of complexity is further based on a user role with respect to the computer-based application.

26. The media of claim 22, wherein the method includes automatically determining whether the input comprises more than a predetermined number of distinct data items.

27. The media of claim 22, wherein the computer-based application is an object-oriented application, and the method includes determining whether the error pertains to more than one object of the computer-based application.

* * * * *